(12) United States Patent
Galvão et al.

(10) Patent No.: US 11,987,344 B2
(45) Date of Patent: May 21, 2024

(54) RUDDER SYSTEM ARCHITECTURE FOR ELECTRICAL ACTUATORS

(71) Applicant: EMBRAER S.A., São José dos Campos-SP (BR)

(72) Inventors: Marcelo Galvão, São José dos Campos-SP (BR); Daniel Paulo de Tarso Ferreira, São José dos Campos-SP (BR); Marcos Vinicius Campos, São José dos Campos-SP (BR)

(73) Assignee: Embraer S.A., São José dos Campos-SP (BR)

( * ) Notice: Subject to any disclaimer, the term of this patent is extended or adjusted under 35 U.S.C. 154(b) by 0 days.

(21) Appl. No.: 16/927,692

(22) Filed: Jul. 13, 2020

(65) Prior Publication Data

US 2022/0009616 A1 Jan. 13, 2022

(51) Int. Cl.
*B64C 13/50* (2006.01)
*B64C 13/04* (2006.01)

(52) U.S. Cl.
CPC .......... *B64C 13/503* (2013.01); *B64C 13/04* (2013.01); *B64C 13/505* (2018.01)

(58) Field of Classification Search
CPC ..... B64C 13/503; B64C 13/04; B64C 13/505; B64C 13/044
See application file for complete search history.

(56) References Cited

U.S. PATENT DOCUMENTS

| 8,567,715 | B2 | 10/2013 | Fervel et al. |
| 9,126,677 | B1 * | 9/2015 | Curtis ................ B64C 13/042 |
| 10,976,751 | B1 * | 4/2021 | Hagerott ............ B64C 13/16 |
| 2007/0007385 | A1 | 1/2007 | Potter et al. |
| 2007/0083301 | A1 * | 4/2007 | Yeh ................... B64C 13/503 244/175 |
| 2008/0203224 | A1 | 8/2008 | Yount et al. |

(Continued)

FOREIGN PATENT DOCUMENTS

EP 3462270 A2 * 4/2019 ............. B64C 13/12

OTHER PUBLICATIONS

Eli Livne, "Aircraft Active Flutter Suppression: State of the Art and Technology Maturation Needs"; 55 Journal of Aircraft No. 1 (Jan.-Feb. 2018), pp. 410-450.

(Continued)

*Primary Examiner* — Rodney A Bonnette
(74) *Attorney, Agent, or Firm* — Nixon & Vanderhye P.C.

(57) ABSTRACT

An electromechanical rudder system control using electromagnetic actuators provides dual redundancy to comply with safety demands. Diversity of possible interconnection distribution allows the manufacturer to choose the proper configuration to satisfy aircraft safety design, hardware savings and overall system quality improvements. A dual channel rudder system architecture includes reconfigurable electronic controllers used to control plural electromechanical primary actuators for rudder control, and a distribution of aircraft and cockpit sensors through the electronic controllers to guarantee minimum required safety standards in case of loss of input data. The plural electromechanical actuators driving a rudder surface are arranged in independent and redundant load paths.

22 Claims, 8 Drawing Sheets (56) References Cited

U.S. PATENT DOCUMENTS

| | | | | |
|---|---|---|---|---|
| 2009/0314901 | A1* | 12/2009 | Granier | G05G 11/00 |
| | | | | 244/221 |
| 2011/0066305 | A1* | 3/2011 | Lin | B64C 19/00 |
| | | | | 701/3 |
| 2012/0259483 | A1* | 10/2012 | Villano | B64C 13/505 |
| | | | | 701/3 |
| 2016/0031554 | A1* | 2/2016 | Eshkenazy | B64C 39/024 |
| | | | | 244/6 |
| 2017/0274986 | A1* | 9/2017 | Huynh | B64C 13/044 |
| 2017/0283039 | A1* | 10/2017 | McCormick | B64C 9/22 |
| 2018/0156293 | A1* | 6/2018 | Fox | F16F 15/073 |
| 2019/0094041 | A1* | 3/2019 | Casia | B64D 45/00 |
| 2019/0127049 | A1* | 5/2019 | Blanding | B64C 13/505 |
| 2019/0359323 | A1* | 11/2019 | Cadotte | B64C 13/503 |
| 2020/0198769 | A1* | 6/2020 | Miyazono | B64C 13/50 |
| 2020/0262544 | A1* | 8/2020 | Wilkens | B64D 43/00 |

OTHER PUBLICATIONS

Extended European Search Report issued in European Application No. 21184942.7 dated Dec. 9, 2021 (11 pages).

"Preventing backdrive in linear actuators", www.firgolliauto.com/blogs/tutorials/preventing-backdrive-in-linear-actuators (Jan. 7, 2020).

* cited by examiner

RUDDER SYSTEM ARCHITECTURE FOR ELECTRICAL ACTUATORS

CROSS-REFERENCE TO RELATED APPLICATIONS

None.

STATEMENT REGARDING FEDERALLY SPONSORED RESEARCH OR DEVELOPMENT

None.

FIELD

The technology herein relates to a complete solution for a dual channel rudder system with an adequate safety level. In more detail, the technology described herein relates to and provides a proposal of electronic architectures, mechanisms and methods able to integrate and control dual and other channel rudder systems using electromechanical actuators, with high integrity and proper availability.

BACKGROUND AND SUMMARY

In the earliest days of flight, the pilot controls in the cockpit directly controlled the aircraft. Typically, cables or other mechanical linkages connected the pilot's inceptor and other cockpit controls to the flaps, rudder and other aerodynamic control surfaces. When the pilot moved a cockpit control, a linkage would link the control movement to an aerodynamic control surface being controlled.

As aircraft increased in size and complexity, direct mechanical linkages were no longer possible. With the advent of electronic cockpits, "fly by wire" control systems replaced manual control systems. Fly by wire systems typically convert the pilot's control inputs to electrical signals that can be conveyed via a wire (electrical conductor) to an appropriate part of the aircraft to be controlled.

Fly-by-wire systems typically require actuator interfaces that convert electrical signals into mechanical actions such as repositioning or moving aerodynamic control surfaces (e.g., ailerons, rudder, flaps, spoilers, etc.). Throughout aeronautical industry history, hydraulic actuators have been used as a feasible and reliable solution to empower and actuate flight control surfaces.

Hydraulic actuator systems rely on fluid pressure to control the position of actuators which in turn provide mechanical movement or position to control surfaces or other parts of the aircraft being controlled. A common example of a hydraulic actuator that most consumers are familiar with is the brakes on an automobile. When you put your foot on your car's brake pedal, the brake pedal does not directly operate the brake pads. Instead, the brake pedal operates a fluid pump ("master cylinder") that forces brake fluid through hydraulic brake lines to apply fluid pressure to operate actuators (e.g., calipers) at the wheels. The fluid-operated actuators press the brake pads into contact with the wheel rotors to provide braking.

Aircraft hydraulic actuator systems are even more reliable and more thoroughly engineered. Such usage relies on the domain of the technology and many other advantages inherent in the dynamic of these kinds of devices. However, despite improvements to hydraulic actuator technology throughout flight history, e.g. size reduction, better materials, higher pressure and others, hydraulic systems have their own burdens, especially when applied to smaller planes and improved existing airframes. For example, hydraulic solutions typically require hydraulic pumps, hydraulic pipes, valves and fluid reservoirs, and hydraulic fluid contamination can cause maintenance problems.

An alternative approach to controlling actuators on board an aircraft uses electromechanical control. Such electromechanical control typically relies on an electric device such as a motor or solenoid to provide mechanical movement or position. For example, one common type of electromechanical actuator electrically activates a motor that e.g., turns a screw. The position or movement of the screw determines the position or movement of an aircraft part to be controlled.

Traditionally, the aeronautical industry has limited usage of electromechanical actuators to slower actuator applications, such as flap deployment and pitch trim actuators. There are many reasons for such restrictions, such as weight-to-power ratio, reliability, device response speed and others. However, advances in electromechanical actuator and control technology make it possible to overcome many of the limitations of the past.

More specifically, electromechanical actuators have recently been applied as solutions for faster aerodynamic surface control in applications where the severity of the consequences of failure is not high. For example, electromechanical actuators are now being used in applications such as spoilers or primary surfaces of unmanned vehicles, and have been proven as feasible and reliable solutions for these kinds of applications.

While improvements have been made to electromechanical actuators for aerospace use, further improvements are possible and desirable.

BRIEF DESCRIPTION OF THE DRAWINGS

The following detailed description of exemplary non-limiting illustrative embodiments is to be read in conjunction with the drawings of which.

DETAILED DESCRIPTION

The technology herein provides a complete solution to implementing an architecture able to integrate a dual channel rudder system using electromechanical actuators. The structure of the architecture permits also the application of high level functions, such as control laws, built in tests, monitoring, resources savings, system integrity improvement through data sharing, maintenance tasks, controllers field loading and test port access. The solution also deals with mechanical concerns inherent in a primary flight control surface, such as backlash and flutter suppression.

Backlash, Flutter Suppression and Jam Prevention

The usage of electromechanical actuators for control of primary control surfaces raises different failure conditions as compared to electrohydraulics. Problems and solutions to overcome these problems will be described below.

Backlash is one mechanical barrier to overcome when using an electromechanical actuator. In the aerospace industry, the requirements to be complied with are often very tight, in favor of a really refined solution in actuator construction and design to attend to backlash. Design decisions can provide solutions in order to diminish backlash, such as lever arrangements or mechanical techniques that reduce or eliminate backlash of the gearbox.

Backlash can be seen for example when the direction of travel of a mechanical system is reversed. Think of two gears with meshing teeth. The teeth of a driving gear will be in contact with corresponding teeth of a driven gear. If the direction of rotation of the gears is reversed, the teeth of the driving gear must rotate slightly through free space before they contact adjacent corresponding teeth of the driven gear and begin to turn the driven gear in the opposite direction. Since the initial movement of an actuator in such a system is absorbed by such lash or play, a delay after the control is first applied occurs before the actuator absorbs the play and responds and begins moving in the desired direction.

When backlash requirements are not completely satisfied, the control surface may flutter. Flutter occurs when the control surface moves back and forth like a pendulum, providing forced simple harmonic motion with increasing amplitude. See e.g. Livne, "Aircraft Active Flutter Suppression: State of the Art and Technology Maturation Needs", 55 Journal of Aircraft No. 1 (January-February 2018); Marqui Jr. et al, "A flutter suppression active controller", https://doi.org/10.1243/095441005X9102 (2005).

Mass balancing or a damper device can supply flutter suppression. In addition, for cases where the mechanical design complies with backlash requirements, the electromechanical actuators can be used as damping devices, using back EMF (electromotive force) to empower damping of the system and thus suppress flutter. In some embodiments, a failed condition or a passive state of the electromechanical actuator is the damping mode, where coils of the actuator are short circuited when the actuator is not being used to reposition the control surface, to provide electromechanical damping of the control surface. If the damping characteristics of the actuators are not sufficient to provide the required damping, an additional passive damping device(s) can be added. Another solution for this case would be to use brakes. In case of a failure mode of both electromechanical actuators, brakes can transition to passive state that would hold the position of the control surface on a last commanded position before failure. The decision on which solution(s) is/are to be used is up to the designer and system requirements, as each solution has its pros and cons. In addition, the electromechanical actuators (using back EMF) may be used to replace the gust lock device. While on ground with the aircraft engines turned off (e.g. aircraft parked), a wind gust may move the control surface (rudder surface) causing damage to the aircraft. In conventional aircrafts, the gust lock device locks the control surface to avoid this effect. In one embodiment, the back EMF may be used so that, even if a wind gust moves the control surface inappropriately, such control surface receives a damping effect that avoids the generation of a fast control surface deflection that would damage the aircraft.

Jamming is another main concern related to electromechanical actuators. Although this issue has considerably diminished or even almost faded out over the history of aircraft development, it is a consensus in the aeronautical engineering community that electromechanical actuators are more prone to jamming than hydraulic actuators. The rudder is a primary control surface that has a less severity failure classification for such jamming conditions, making the rudder the fittest or a fit candidate for this kind of solution.

Redundancy for Fault Tolerance

A rudder system typically demands high safety level standards. Attaining such standards typically requires redundancy and the use of devices with very low failure rate. The example non-limiting architecture proposed herein provides dual redundancy and resources to cover single and common failures, mitigates dormant failures, provides high maintenance task integrity, and enables failure diagnosis and redundancy of failure reports.

The rudder system architecture proposed herein provides solutions to suppress issues with essential data necessary to sustain normal mode operation. The distribution of devices that comprise the architecture and signals routing in some embodiments is arranged in such a manner as to provide a proper availability of the instances to ensure desired safety level. Other safety concerns are also mitigated. For example, the distribution of line replaceable units (LRUs) and communication can provide means to prevent issues regarding common mode failures, erroneous processing, single failures, one-plus probable failures and others. Redundant and dissimilar sources of data are provided in order to achieve these goals. The nature of the example non-limiting architecture promotes different options for dual channel dynamics, such as active—active, active—stand by, main and back up channel and master—slave.

The plural controllers are primarily connected between and communicate with each other through at least one high performance, high integrity digital bus. The use of a digital bus allows the plural controllers to share data, increasing the options of source data and improving the integrity of the system. Moreover, a digital bus permits the implementation of high integrity functionalities for flight operation, maintenance, failure reports, information routing redundancy and monitoring. In case of intercommunication bus failure, a proper distribution of critical sensors and signals connected directly to the controllers, such as connection(s) with avionics and discrete connection(s) between both controllers, can guarantee a proper controllability and continued safe flight and landing. In case of failure in such an example non-limiting configuration, the dynamics of the system will be assisted by the remaining resources and some functionalities may be lost. Minimum safety standards are guaranteed through a proper number and zonal distribution of electronic computers.

Depending of the scope of certification, the example non-limiting architectures can comprise just one or two controller types of high integrity, using plural dissimilar controllers. High integrity is obtained through use of dissimilar command and monitoring lanes, in which each frame of a calculation is performed simultaneously and compared between plural digital lanes. In case of disagreement between plural parallel computations, commands are not in some embodiments sent to the devices under control such as actuators and valves. Instead, some embodiments send a failure flag or other indicator to the crew and maintenance computers. In this condition, all outputs of the controller cease and all devices controlled by it are settled down to passive states, which may be the safest option.

In the proposed architecture, there can be plural types of high integrity controllers with dissimilarity to protect against common mode failure. In an example embodiment, since the role of both actuators is the same, one can take the place of the other. This swap facilitates troubleshooting in the field. In order to ensure that there are different types installed, a power up built in test checks if adjacent controllers are of different types (each controller can check whether the adjacent controller is of a different type). Also, each controller checks its own installation position and the adjacent (e.g. the controller identified as controller on position #1 checks if its adjacent is identified as controller on position #2 and vice-versa).

Dissimilarity between two different types of controllers is used when it is helpful to comply with common mode failures. In general, all complex devices (COTS) such as field programmable gate arrays (FPGAs) and processors are dissimilar between the internal lanes of the same electronic box or unit, this approach ensuring that a common failure mode won't occur in both lanes, avoiding undetected failures.

The arrangement, distribution and connections of the devices, components and equipment between the rudder system and others share information from the aircraft and cockpit sensors, optimizing harness capabilities and reducing weight. In this case, a thorough safety assessment may be performed to guarantee the minimum safety requirements for the new failure hazards introduced by this integrated configuration.

In one example proposed architecture, there are only two pedal sensors available which will be valid only when both sensors are valid and match with one another. This project decision makes pedal inputs availability poor; however, yaw controllability can be overcome using the remaining resources. Yaw trim switches can be used as pilot inputs in place of pedal. Yaw trim does not have the same efficiency as pilot pedal depression but it is a resource to relieve pilot workload. Other functions such as "beta control laws" and "one-engine-inoperative (OEI) condition compensation" remain functional, making the usage of pedal practically not necessary.

Example Overall Rudder Control Approach

Figure 1:
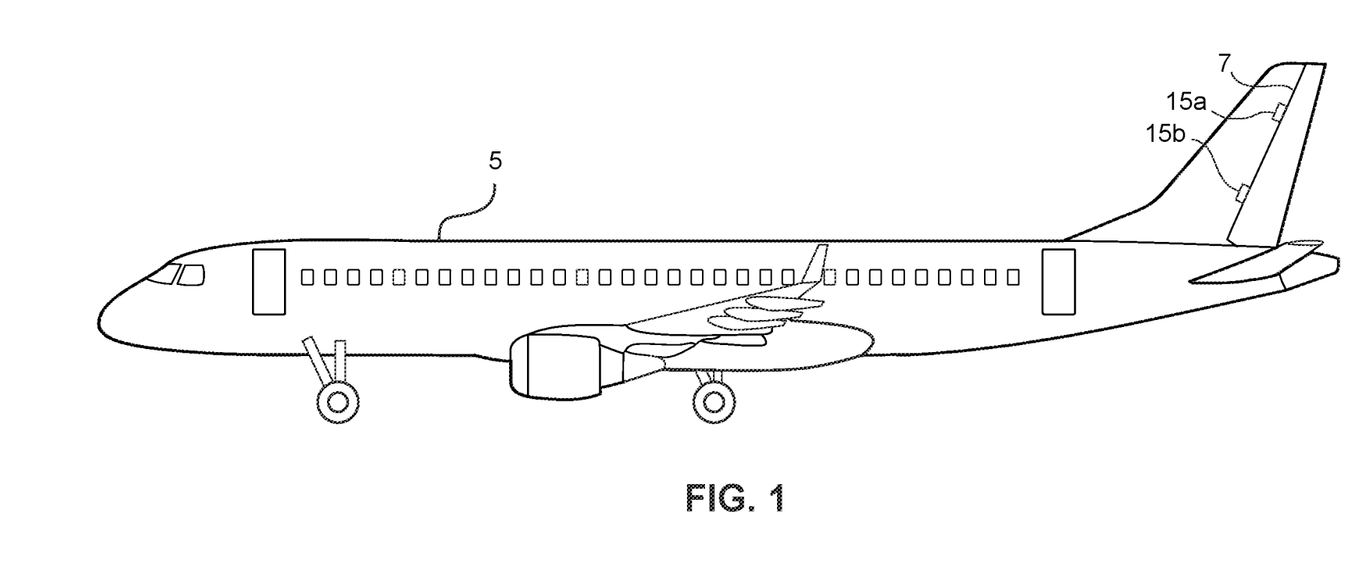
FIG. 1 shows a non-limiting aircraft with electromechanical actuator control of the rudder control surface.

FIG. 1 shows an example aircraft 5 including a rudder 7. In the example shown, the rudder 7 comprises a movable part of the vertical stabilizer located on the tail portion of the aircraft. The pilots and the electronic flight rudder control system 10 steer the aircraft 5 by controlling electromechanical actuators 15a, 15b to move and position the rudder 7. Electromechanical actuators 15a, 15b control the rudder 7 to move to port, to starboard or to a neutral position in between, thereby causing a flying aircraft 5 to yaw to the right, yaw to the left, or not yaw at all, respectively.

In one example embodiment, the rudder control system 10 moves a single rudder aerodynamic control surface 7 attached to the aircraft 5's vertical stabilizer. Two electromechanical actuators 15a, 15b, that are electrically commanded and electrically powered, are connected to the rudder control surface 7, receiving signals from the rudder control's fly by wire system 10. In an example embodiment, the upper rudder actuator 15a and the lower rudder actuator 15b can each independently control the rudder 7 aerodynamic control surface.

Figure 2:
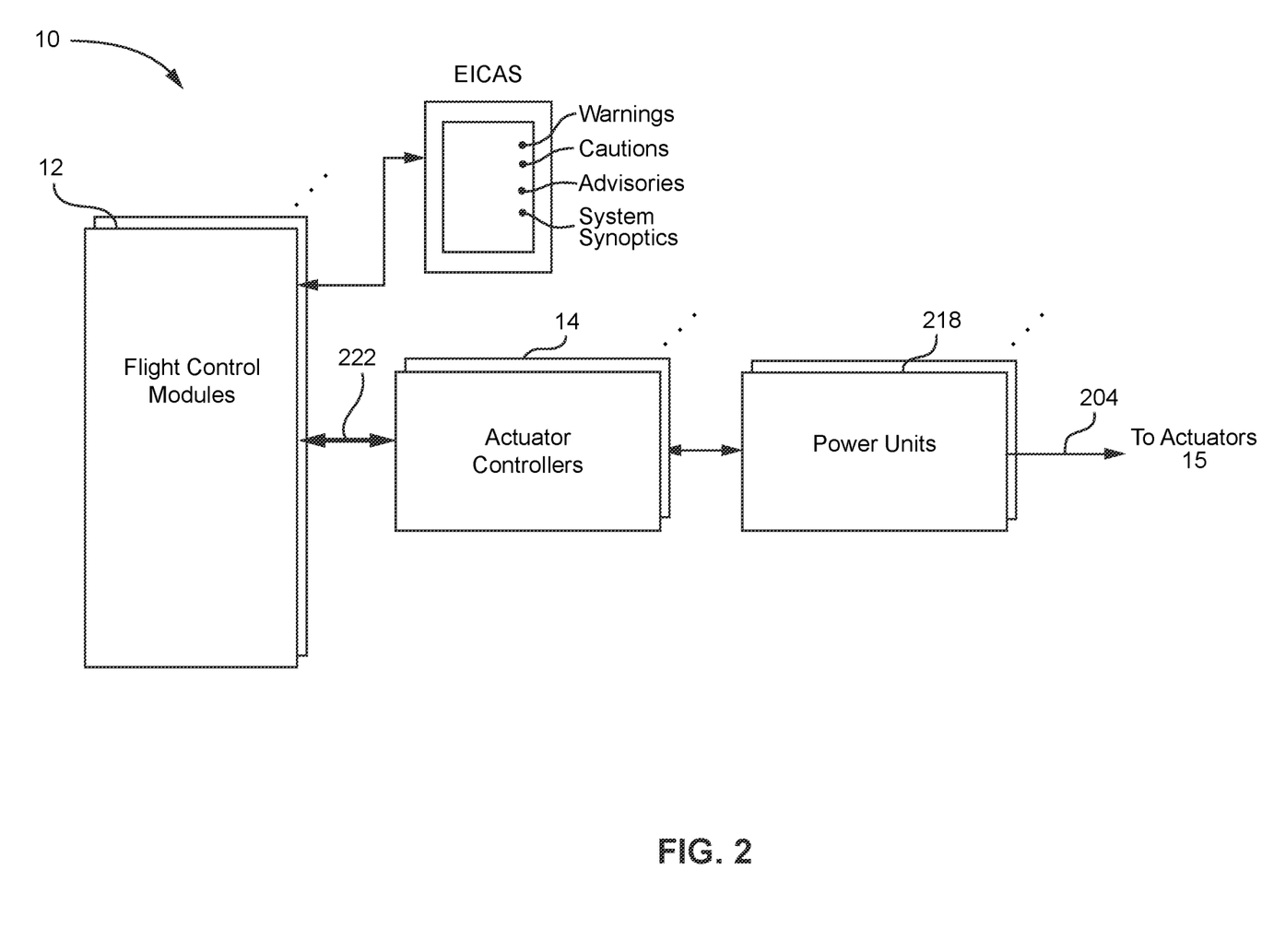
FIG. 2 shows an example non-limiting electromechanical rudder control system.

FIG. 2 shows an example high level block diagram of an example fly-by-wire electromechanical rudder control system 10. In this example, a flight control module (computer) (FCM) 12 interacts with one or more (in one example embodiment, plural or two) hardware-based actuator controllers 14. The actuator controllers 14 and the FCM 12 each receive pilot, input. The actuator controllers 14 provide control outputs to respective power unit(s) 218A 218B (see FIG. 6), which apply electrical actuating power via connections 204 to electromechanical actuators 15. The electromechanical actuators 15 control/position the rudder 7 in response to the applied electrical power. The EICAS (engine-indicating and crew-alerting system) provides displays and sounds that inform the pilots and flight crew what's going on.

Figure 3:
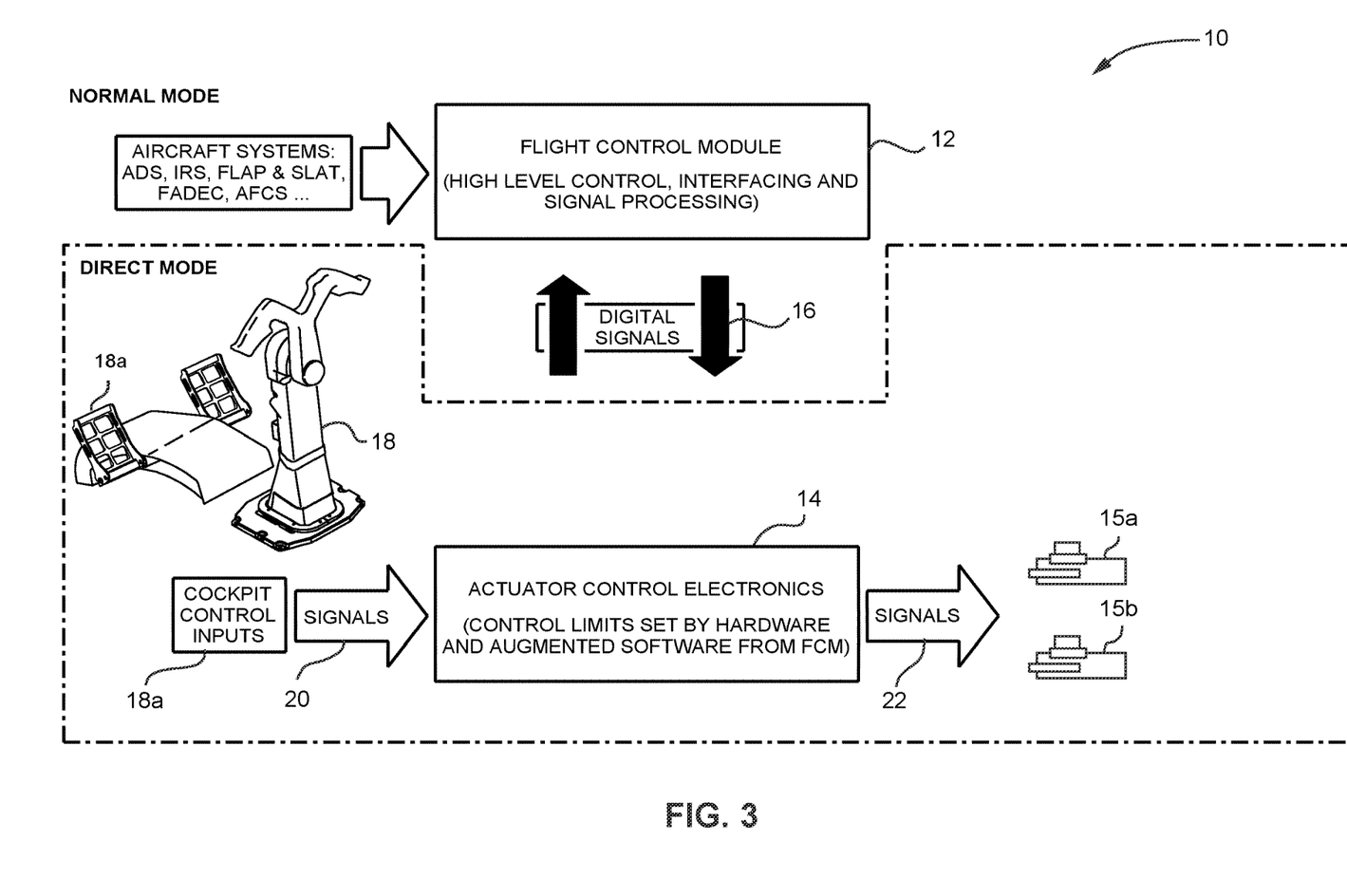
FIG. 3 shows an example more detailed non-limiting electromechanical rudder control system.
Figure 4:
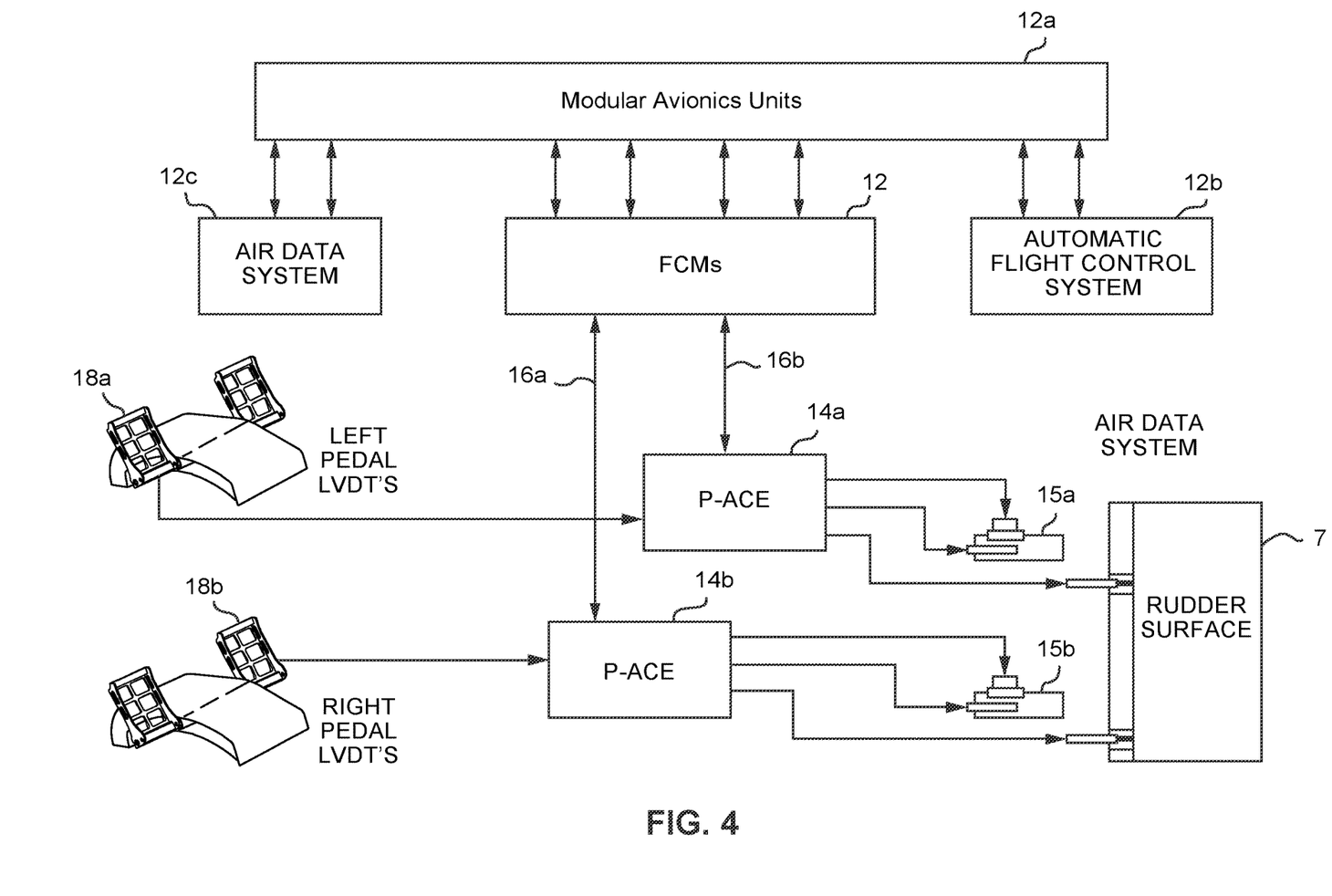
FIG. 4 shows a more detailed block diagram of an example non-limiting electromechanical rudder control system.
Figure 5:
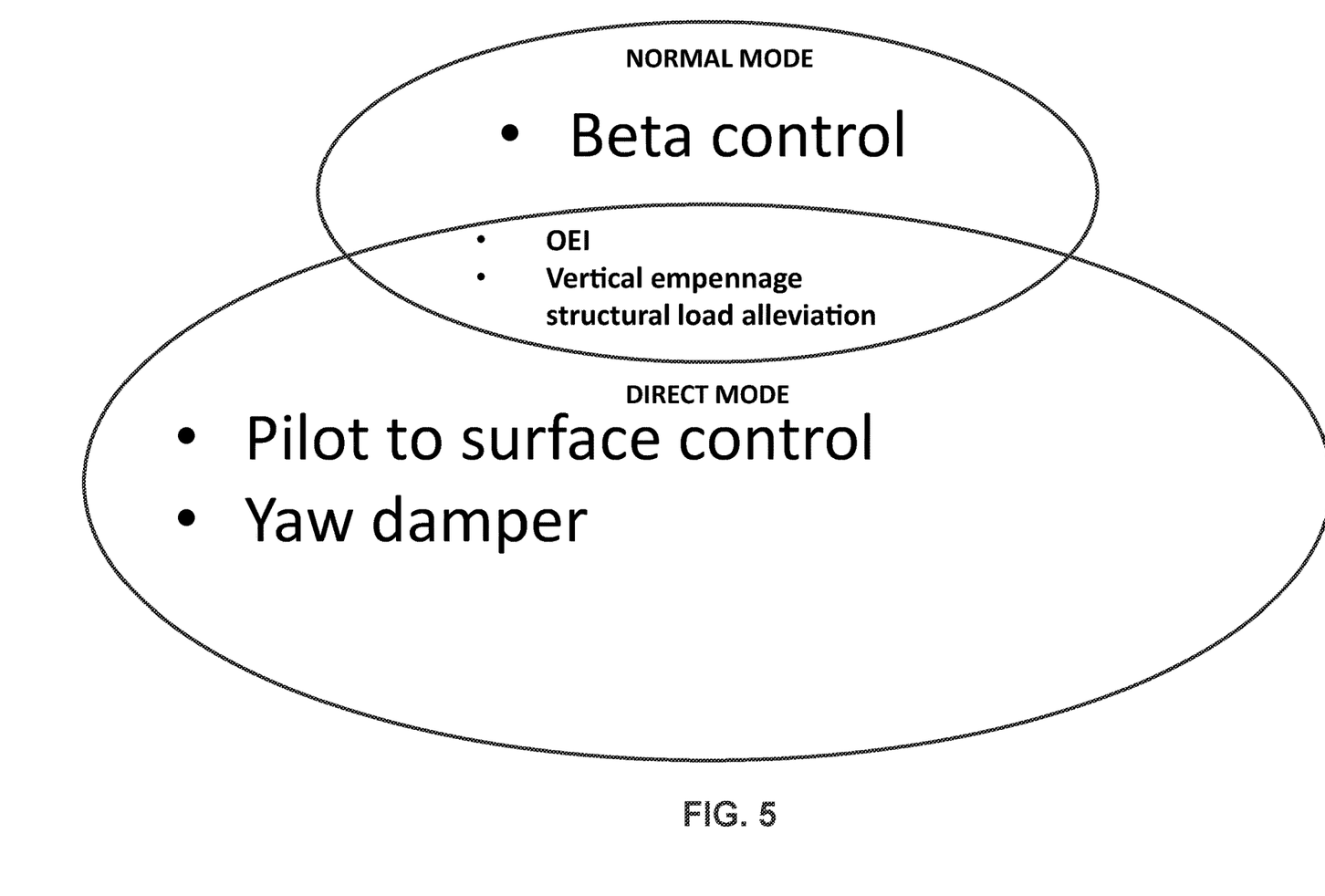
FIG. 5 shows an example Venn diagram of example normal and direct mode operation of an electromechanical rudder control system.

FIGS. 3-5 show more details of an example overall non-limiting rudder control system 10 including a normal mode and a direct mode. System 10 provides a fly-by-wire electronic system designed to operate the flight controls yaw using actuator control electronics 14 and associated electromechanical actuator(s) 15. In one example embodiment, primary actuator control electronics 14 can in direct mode respond directly to pedals 18a, 18b to allow the pilots to directly control the rudder actuator(s) 15. In the normal mode, the rudder control system 10 is controlled by the pilots, the FCM 12 high level functions, and/or the autopilot.

As FIG. 4 shows, in direct mode, the captain's (left) pedal 18a commands only the upper actuator 15a and the first officer's (right) pedal 18b commands only the lower actuator 15b. In an example non-limiting embodiment, first and second independent actuator control electronic units 14 drive the upper and lower rudder actuators 15a, 15b, respectively, providing pedal shaping to vary the pedal-to-rudder surface 7 transform as a function of pilot input.

In one example non-limiting embodiment, the rudder actuators 15a, 15b operate in an active/standby configuration, so that the plural actuator control electronics units 14 alternate between active and standby every time the rudder control system 10 is powered up. In one example embodiment, two pedal assemblies (the captain's pedals 18a and the first officer's pedals 18b) are connected by an interconnect rod or other synchronization mechanism in such a way that movements made by the pilot flying the plane are transmitted to the other pilot. In the event of a jam in the pedal assemblies, the rudder 7 remains active and will be actuated by high level functions (yaw damping and turn coordination) by FCM 12. In the case that one of the rudder actuators 15a, 15b becomes jammed, the rudder control surface 7 can become locked at the current control position. If this happens, the pilots can establish aircraft yaw control by operating the ailerons and roll spoilers.

The Flight Control Computer (FCM) 12 provides software-based assistance to the primary actuator control electronics 14 via a bus 16 (see FIG. 4, lines 16a, 16b), providing digital inputs to the primary actuator control electronics 14 (see FIG. 4, blocks 14a, 14b), which are combined with pilot inputs from pedals and associated LVDTs (Linear Variable Differential Transformers) 18a, 18b. The FCM 12 is used to augment pilot inputs for different airspeeds, and provides other high level functions to the primary actuator control electronics 14.

FIG. 5 shows an example rudder control schema for normal and direct modes. In the direct mode, the pilots directly control the position of the rudder surface 7 with their pedals 18a. Specifically, in direct mode, control input provided by the Captain and First Officer's sensors are sent directly to respective rudder actuator(s) 15a, 15b each of which can independently control the rudder 7 (they also can operate in tandem to move the rudder faster or more effectively). Additionally, the system 10 in direct mode automatically provides yaw damping and vertical empennage structural load alleviation through rudder 7 control. The diagram shows that rudder 7 control during "one engine inoperable" (OEI) conditions are also provided in direct mode.

In "normal" mode, the FCM 12 provides beta control that in part controls the rudder 7 position in response to e.g., air data and inertial information from the AHRS (Attitude and Heading Reference System). In particular, the FCM 12 (which is coupled to modular avionics units 12a and automatic flight control system 12b) augments control by primary actuator control electronics 14 by providing software-based airspeed gain schedules and control limits such as yaw damper and turn coordination, rudder ground/lift authority change, and rudder airspeed gain scheduling and stroke limiting, as a function of airspeed (see air data system 12c). In one embodiment, with increasing airspeed, rudder gain is reduced by the FCM 12 to compensate for increase in rudder effectiveness and to provide structural protection to the rudder surface. When the FCM 12 is removed from the control loop (for instance due to airspeed data loss or due to FCM failure), the control limits default to values and fixed control laws set by hardware and/or software in the actuator alleviation through rudder 7 control. The diagram shows that rudder 7 control during "one engine inoperable" (OEI) conditions are also provided in normal mode.

In one example non-limiting embodiment, a dedicated button on the FCM 12 panel allows the pilot to reset the rudder system to normal mode in case the rudder system 10 is operating in direct mode when it shouldn't be, or to place the rudder control system into direct mode in the event the FCM 12 is computing the wrong gain or otherwise is causing rudder control errors.

Example Dual Channel Architecture

Figure 6:
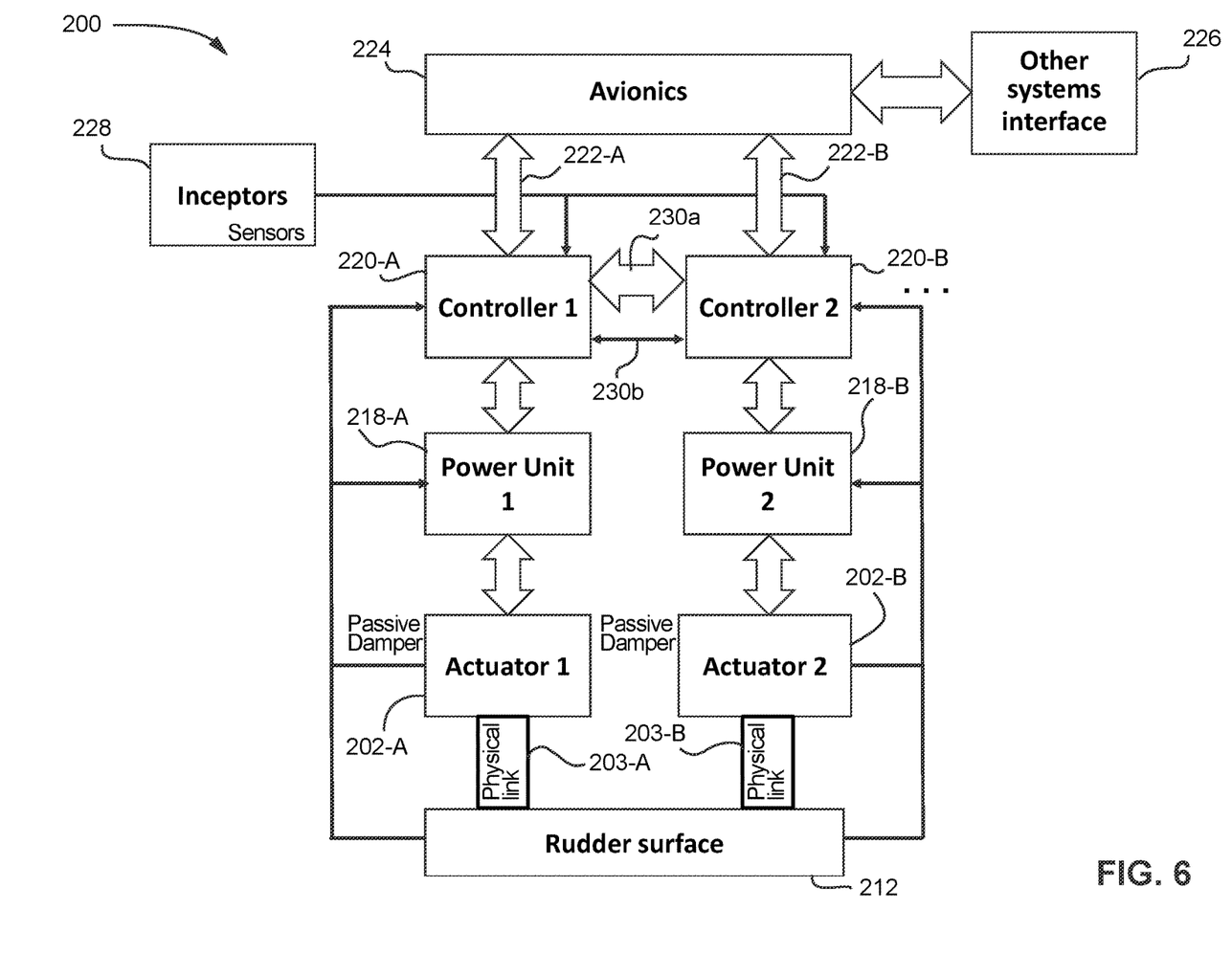
FIG. 6 shows an example redundant electromechanical rudder control system.

An example non-limiting dual channel rudder system 200 is shown in FIG. 6. In this example non-limiting embodiment, there are plural controllers (e.g., controller 220A, 220B) and associated control channels. All critical inputs and outputs are directly interconnected via data paths 222A, 222B to each of the plural controllers (220-A, 220-B), and all other inputs and outputs are indirectly connected to each controller. High level functions, which are designed to improve aircraft airworthiness, system availability, flight quality, passenger comfort, aircraft aerodynamic loads relief and any other, are also hosted in or by the controllers (220-A, 220-B).

The logic which rules the dynamic of system operation, such as engagement priority and sequence for controller in control, is also hosted within the controllers (220-A, 220-B). This logic in one example embodiment relies on the information provided by a cross channel data link 230a and can be reinforced using additional discrete interconnections 230b.

The controllers 220 communicate with external systems through avionics 224 via links (222) and other systems interface 226. However when necessary to reinforce integrity, this connection can be duplicated and connected directly to the other system(s) (see added FIG. 7 link 240) in order to have a redundant connection to support the availability of critical functionality. Controllers 220 can thus communicate directly with external systems via interface 226 if/when (i) avionics 224 fails or is unavailable or (ii) the data coming from the avionics has a significant delay which compromises its use.

Additional monitoring and system coordination can be implemented by or through avionics (224), depending on critical safety assessment. For example, avionics (224) can be used as a second or third part to complement the integrity of the rudder control system 200 under control, sending high level commands to controllers 220 to settle down when critical conditions are achieved.

In the example shown, the signals coming from the aircraft and cockpit sensors are received through analog, discrete or digital interfaces. Typically, complex sensors like attitude and heading reference system (AHRS) and Smart Probes have digital buses, as main interfaces. Cockpit switches like yaw trim, direct mode reversion and cut out switches often use discrete interfaces. Inceptors 228 usually are connected via analog interfaces.

In the FIG. 6 example shown, each of controllers 220 communicates with a respective power unit 218 that in turn supplies power to a respective electromechanical actuator 202. The electromechanical actuators 202 in turn are connected by respective physical links 203 to a rudder aerodynamic control surface 212 (same as 7 in FIG. 1). Each controller 220 is capable of independently controlling the position of the rudder control surface 212 via its respective power unit 218, actuator 202 and physical links 203A, 203B.

In some embodiments, the controllers 220 operate in tandem (or at least in a coordinated way) to provide more mechanical power to move and position rudder surface 212. If one controller 220 fails, the other controller 220 (which, being of a different structure and/or design and operating on a different independent control channel, will generally not suffer from a common mode failure) can move and/or position rudder surface 212 by itself. Alternatively, in some embodiments, the controllers 220 may be not dissimilar controllers if the safety analysis allows to use similar controllers.

Hardware Diversity Increases Fault Tolerance

Depending on safety level demand, it is possible to use two dissimilar types of controller units 220a, 220b with high integrity using command and monitoring lanes. Using two different types of controllers 220a, 220b enables the system to deal with any type of common mode errors associated with hardware design, ensuring continuous airworthiness.

In particular, in the example embodiment shown, controllers 220a, 220b are or comprise different types of high integrity controllers. High integrity is obtained through use of dissimilar command and monitoring lanes, in which each frame of a calculation is performed simultaneously and compared between plural digital lanes. In case of disagreement between the two computations of controllers 220a, 220b, commands are not sent to actuators 202a, 202b. Instead, a failure flag or other indicator is sent to the crew and maintenance computers. In this condition, all outputs of the controllers 220a, 220b cease and actuators 202a, 202b are settled down to passive states.

Dissimilarity between two types of controllers 220a, 220b allows the system to avoid common mode failures. In general, all complex devices (COTS) such as field programmable gate arrays (FPGAs) and processors are dissimilar between the internal lanes of the same electronic box or unit, this approach ensuring that a common failure mode won't occur in both lanes or channels, avoiding undetected failures caused by this condition.

The nature of the example non-limiting architecture promotes different options for dual channel dynamics, such as active—active, active—stand by, main and back up channel and master—slave. Because the plural controllers 220a, 220b are primarily connected between and communicate with each other through a high performance and high integrity digital bus 230a, the plural controllers 220a, 220b can share data—increasing the options of source data and improving the integrity of the system. Digital bus 230a also permits the implementation of high integrity functionalities for flight operation, maintenance, failure reports, information routing redundancy and monitoring. The cross channel data link 230a between plural controllers thus allows the system designer more than one option to choose the operation dynamics between controllers 220a, 220b, i.e. active-active, active-stand by, main-back up or master-slave. Cross channel can also be used for other functionalities such as compensation rules, high level functions, maintenance, failure report, data sharing and monitoring.

Figure 7:
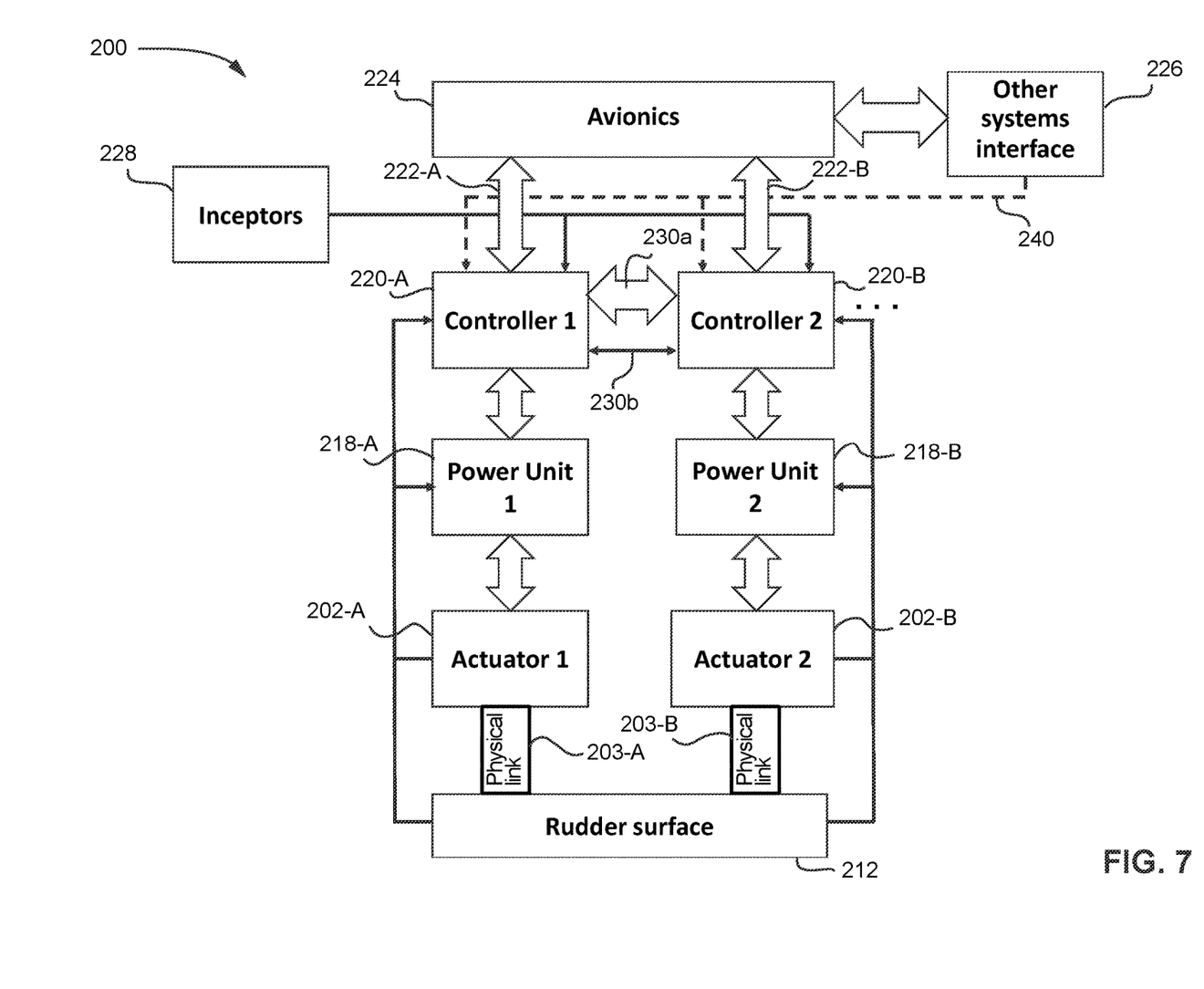
FIG. 7 shows a new distribution of interconnections within an electromechanical rudder control system and other systems.

In case of intercommunication bus 230a failure, FIG. 7 shows an alternative, proper distribution of critical sensors and signals connected directly to the controllers 220a, 220b, such as connection(s) with avionics and discrete connection(s) between both controllers, to guarantee a proper controllability and continued safe flight and landing. In this example configuration, the dynamics of the system 10 will be assisted by the remaining resources and some functionalities may be lost. Minimum safety standards are guaranteed through a proper number and zonal distribution of electronic computers.

Figure 8:
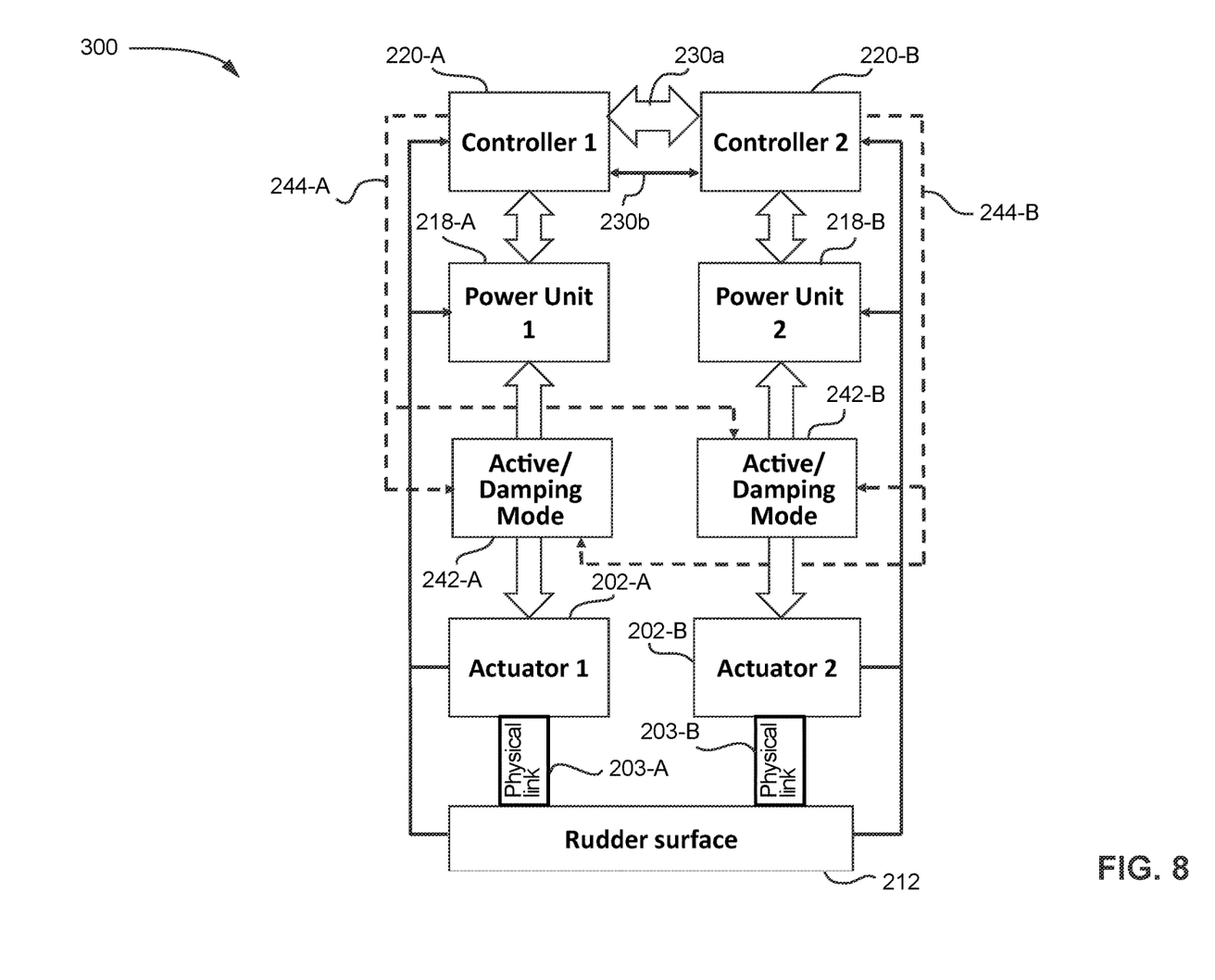
FIG. 8 shows details of an example damping solution.

FIG. 8 shows a part of a more detailed embodiment 300 in which power units 218 respectively communicate with actuators 202 via active/damping mode driver circuits 242. The active/damping mode driver circuits 242 can provide electrical (e.g., back EMF) damping to eliminate or reduce lash and/or flutter as discussed above. In the example shown, controller 244-A is also linked via link 244-A to driving circuit 242-B, and controller 244-B is also linked via link 244-B to driving circuit 242-A. In the example shown, controller 220-A controls the amount of damping provided by driving circuit 242-A via a link 244-A, and controller 220-B controls the amount of damping provided by driving circuit 242-B via a link 244-B. Using this arrangement, each controller 220-A (220-B) can exercise damping control over the actuator 202-B (220-A) controlled by the other controller 220-B (220-A).

In an example non-limiting embodiment, the electromechanical actuators 202a, 202b are used as damping devices, using back EMF (electromotive force) to empower damping of the system. A failed condition or a passive state of the electromechanical actuator 15 is the damping mode, where coils of the actuators 202a, 202b are short circuited in order to provide damping to the rudder control surface 7. If the damping characteristics of the actuators 202a, 202b are not sufficient to provide the damping required, an additional passive damping device(s) can be added. When backlash requirements are not satisfied, mass balancing or an additional damper device can supply flutter suppression. The back EMF from a motor actuator 202a, 202b can be used as means of flutter suppression, if all other mechanical and electrical dimensions comply with the demands for a flutter suppression mechanism.

Electromechanical actuators 202a, 202b commonly use a digital resolver to control motor commutation. The system can take advantage of this resource to save additional position monitoring sensors (usually it is necessary to use a position sensor for each of actuators 202a, 202b and another position sensor for the control surface 7). A resolver used to position an actuator 202a, 202b is compared with a position sensor that monitors the position of the rudder 7 in order to validate the position and detect a disruption of a mechanical link. The resolver and position sensor rate are compared with each other as another means to validate both sensors. Resolvers and position sensors from an adjacent channel(s) can be used to isolate failed component(s).

Two levels of inflight applications are hosted in the controllers 220a, 220b. One level is for the primary actuator control, such as position control, monitoring, data voting and actuator engagement processes. The other level is for the control laws, which rely on air and inertial data, weight on wheels (WOW) and wheel speed data. Control Laws are implemented in order to improve aircraft maneuverability, relieving pilot workload.

The connection with avionics 224 allows the controllers 220a, 220b to have access to a diversity of information, allowing implementation of high level functions. In some embodiments, essential information for operation of the device to be controlled is directly interfaced with the controllers 220a, 220b. Loss of communication with avionics 224 will degrade the mode of operation, but airworthiness will be maintained with the remaining resources.

Depending on the application, direct connections to other systems can be implemented in order to increase safety level, diminishing the possibilities of common errors, generic failures and improving the availability of system functionalities.

The command path can be directly from cockpit inceptors or indirectly from avionics interconnections. The commands are augmented by the controller high level functions, supported by information provided from other systems. Depending on the application, loss of command inputs may not necessarily shut down all functionalities of the system; some of them will be kept functionally supported by the remaining information (e.g., yaw damper, thrust asymmetry compensation and Beta control.)

Motor torque of motors that are part of actuators 202a, 202b can be controlled in order to protect the rudder 7 and vertical tail from excessive aerodynamic loads, getting rid of mechanical parts such as slip clutches to perform the same purpose or function;

System integrity can be reinforced applying step commands on PBTI or IBIT tests. The step response of the system can reveal anomalies when not achieving the desired response;

Avionics computational resources can be used as an additional (e.g., third) active element for rudder system monitoring, sending disengagement request commands to a bad channel when a critical condition is achieved.

Either primary applications or control laws can operate segregated or separately if the minimal required conditions are satisfied. For instance, if only pedal input commands are lost, the remaining information can keep other functionalities available, such as yaw trim command, yaw damper, Beta control, other. If air data is lost, rudder gain scheduling can be based on flap position, a yaw damper can rely on inertial data, and thrust asymmetry can be based on Thrust Lever Angle (TLA) position or N1 and N2 values (e.g., fan speed and engine core speed).

Yaw trim commands are available in example non-limiting architectures in order to relieve pilot work load in the scenario of loss of pedals command.

An electric dual (or plural) channel rudder system within an example non-limiting architecture thus provides several advantages including:

Optimization of available electronic capability, reducing weight. There is no need for an extra computer to embed high level functions;

Increase of availability of the rudder systems without necessarily increasing hardware, improving safety;

Possibility of providing a generic-failure safety.

Improvement of aircraft flying qualities, reducing pilot workloads using aircraft resources without adding extra sensors besides the rudder system.

Easier to be implemented in an existing airframe.

While the example embodiments above describe controlling the rudder 7, other embodiments can control other aerodynamic control surfaces or other control mechanisms.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A dual channel rudder system architecture comprising:
    first and second electronic controllers configured to provide rudder control with plural channel redundancy to first and second corresponding independently-controllable electromechanical actuators for rudder control, the first and second electronic controllers respectively interfacing signals to the first and second electromechanical actuators with independent control signals;
    cross-channel intercommunication connections between the first and second electronic controllers, the cross-channel intercommunication connections including a redundant data communication bus and/or usage of discrete communications configured to coordinate dynamic operation of system discrete communications introducing a dissimilar method for a channel in control dynamic coordination; and
    a distribution of aircraft and cockpit sensors through the first and second electronic controllers to meet minimum required safety standards in case of loss of input data;
    the first and second electromechanical actuators each independently driving a common rudder control surface arranged in independent and redundant load paths,
    at least the first electromechanical actuator connected to selectively alternately operate in a drive mode and a damping mode, in the drive mode the first electromechanical actuator being supplied with electrical current to drive the rudder to a position the first electronic controller specifies, in the damping mode the first electromechanical actuator providing back electromotive force (EMF) to dampen movement of the common rudder control surface imparted by wind gusts, thereby making an additional wind gust locking or damping device external to the first and second actuators unnecessary.

2. The system of claim 1 wherein the first and second electronic controllers comprise at least two types of electronic controllers to provide tolerance against common mode type of failures for hardware through the usage of independent command and monitoring computation.

3. The rudder control system of claim 1 wherein the cross channel intercommunication connections are configured to support functionalities of the first and second electronic controllers including compensation rules, high level functions, maintenance, failure report, data sharing and/or monitoring.

4. The system of claim 1 wherein:
    when mandatory due to safety assessment, direct intercommunication between other systems and the first and second controllers is established.

5. The system of claim 1 further including flutter suppression provided accordingly to the system design features, wherein:
    when backlash requirements are met, the back EMF provides damping to the rudder control surface in order to suppress flutter of the rudder control surface, and when backlash requirements are not met, mass balancing and/or an additional damping device suppresses flutter; and
    an additional passive damping device is added for when the first and second actuators are not able to supply enough damping to suppress flutter.

6. The system of claim 1 wherein the first and second electronic controllers each provide first and second levels of application, the levels grouping control of local actuator position, actuator integrity monitoring, active damping mode and system dynamic operation such as engagement logic; and the second, higher level application being used for aircraft aerodynamic control laws, augmenting commands from the first level.

7. A rudder control system comprising:
    first and second pilot inceptors;
    first and second actuator controllers respectively operatively coupled to the first and second pilot inceptors and to corresponding first and second electromechanical rudder actuators;
    cross-channel intercommunication connections between the first and second actuator controllers, the cross-channel intercommunication connections including a redundant data communication bus and/or usage of discrete communications configured to coordinate dynamic operation of system discrete communications introducing a dissimilar method for a channel in control dynamic coordination; and
    a digital bus connecting the first and second actuator controllers to a flight control computer,
    wherein the first and second actuator controllers automatically reconfigure to operate independently of the flight control computer upon failure or disconnection of the flight control computer;
    wherein the first and second actuator controllers comprise diverse hardware implementations to reduce common mode failure;
    wherein the first and second actuator controllers respectively control the first and second electromechanical actuators to drive the position of an aircraft rudder in a first mode and to provide back electromotive force damping to reduce lash and/or flutter and dampen movement to the aircraft rudder imparted by wind gusts in a damping mode, thereby making an additional wind gust locking or damping device external to the first and second actuator controllers unnecessary;
    wherein each actuator and associated actuator controller is capable of independently controlling the aircraft rudder aerodynamic control surface in response to a corresponding at least one of the first and second pilot inceptors.

8. The rudder control system of claim 7 wherein the first inceptor is operable by a first pilot and the second inceptor operable by a second pilot different from the first pilot, the first actuator controller is independently responsive to the first inceptor, and the second actuator controller is independently responsive to the second inceptor.

9. The rudder control system of claim 7 wherein the—first and second actuator controllers are configured to guarantee tolerance of the architecture against common mode type of failures for hardware through the usage of independent command and monitoring computation.

10. The rudder control system of claim 7 wherein the cross channel intercommunication connections are configured to support functionalities of the first and second actuator controllers including compensation rules, high level functions, maintenance, failure report, data sharing and/or monitoring.

11. The rudder control system of claim 7 wherein:
when mandatory due to safety assessment, direct intercommunication between other systems and the first and second controllers is established.

12. The rudder control system of claim 7 wherein:
when backlash requirements are met, the back electromotive force provides damping to suppress flutter of the rudder, and when backlash requirements are not met, mass balancing and/or an additional damping device suppresses flutter of the rudder; and
the rudder control system further comprises an additional passive damping device for when the first and second actuators are unable to supply enough damping to suppress flutter of the rudder.

13. The rudder control system of claim 7 wherein the first and second actuator controllers each provide first and second levels of application, the levels grouping control of local actuator position, actuator integrity monitoring, active damping mode and system dynamic operation such as engagement logic; the second, higher level application being used for aircraft aerodynamic control laws, augmenting commands from the first level.

14. A rudder control system for controlling a rudder of an aircraft, comprising:
a first pilot inceptor configured for operation by a first pilot;
a second pilot inceptor configured for operation by a second pilot different from the first pilot;
a first actuator controller operatively coupled to the first pilot inceptor and to a first electromechanical rudder actuator to control the rudder in response to actions by the first pilot, the first actuator controller selectively controlling the first electromechanical actuator to operate in a damping mode providing back electromotive force damping to reduce lash and/or flutter of the rudder;
a second actuator controller operatively coupled to the second pilot inceptor and to a second electromechanical rudder actuator to control the rudder in response to actions by the second pilot, the second actuator controller selectively controlling the second electromechanical actuator to operate in a damping mode providing back electromotive force damping to reduce lash and/or flutter of the rudder, wherein the first and second actuator controllers comprise diverse hardware implementations to reduce common mode failure;
cross-channel intercommunication connections between the first and second actuator controllers, the cross-channel intercommunication connections including a redundant data communication bus and/or usage of discrete communications configured to coordinate dynamic operation of system discrete communications introducing a dissimilar method for a channel in control dynamic coordination; and
a digital bus connecting the first and second actuator controllers to a flight control computer,
wherein the first actuator controller is configured to automatically reconfigure to operate independently of the flight control computer upon failure or disconnection of the flight control computer,
wherein the second actuator controllers is configured to automatically reconfigure to operate independently of the flight control computer upon failure or disconnection of the flight control computer.

15. The rudder control system of claim 14 wherein the plural actuator controllers are configured to guarantee tolerance of the architecture against common mode type of failures for hardware through the usage of independent command and monitoring computation.

16. The rudder control system of claim 14 wherein the cross channel intercommunication connections are configured to support functionalities of the first and second actuator controllers including compensation rules, high level functions, maintenance, failure report, data sharing and/or monitoring.

17. The rudder control system of claim 14 wherein:
when mandatory due to safety assessment, direct intercommunication between other systems and controllers is established.

18. The rudder control system of claim 14 wherein:
when backlash requirements are met, the actuators back electromotive force provides damping to suppress flutter of the rudder aerodynamic surface, and when backlash requirements are not met, mass balancing and/or an additional damping device suppresses flutter of the rudder aerodynamic surface; and
the rudder control system further comprises an additional passive damping device for when actuators are unable to supply enough damping to suppress flutter of the rudder aerodynamic surface.

19. The rudder control system of claim 14 wherein each actuator controller provides first and second levels of application, the levels grouping control of local actuator position, actuator integrity monitoring, active damping mode and system dynamic operation such as engagement logic; the second, higher level application being used for aircraft aerodynamic control laws, augmenting commands from the first level.

20. A rudder control system for controlling a rudder of an aircraft, comprising:
a pilot inceptor configured for manipulation by a pilot;
electromechanical rudder actuators configured to reposition the rudder in response to manipulation of the pilot inceptor by the pilot; and
actuator controllers operatively connected to the pilot inceptor and to the electromechanical rudder actuators, the controllers communicating with one another via redundant cross channel communications interconnects therebetween, the cross-channel intercommunication interconnects including a redundant data communication bus and/or usage of discrete communications configured to coordinate dynamic operation of system discrete communications introducing a dissimilar method for a channel in control dynamic coordination, the controllers being configured to selectively connect the electromechanical rudder actuators to operate in a passive, damping mode during at least some times when the electromechanical rudder actuators are not being used to reposition the rudder, the electromechanical rudder actuators providing back electromotive forces when operating in the passive, damping mode that dampens lash and/or flutter of the rudder.

21. The rudder control system of claim 20 wherein the actuator controllers each selectively short-circuits at least one coil of a respective electromechanical rudder actuator to cause the respective electromechanical rudder actuator to operate in the passive, damping mode.

22. The rudder control system of claim 20 wherein the cross channel communications interconnects are configured to provide intercontroller interconnects supporting other functionalities of the actuator controllers including compensation rules, high level functions, maintenance, failure report, data sharing and/or monitoring.

\* \* \* \* \*